April 5, 1966     R. C. ROSS     3,244,457

TRACK PIN SEAL

Filed May 28, 1964

Inventor
Roy C. Ross
By Charles E. Schuart
Attorneys

United States Patent Office 3,244,457
Patented Apr. 5, 1966

3,244,457
TRACK PIN SEAL
Roy C. Ross, Springfield, Ill., assignor to Allis-Chalmers Manufacturing Company, Milwaukee, Wis.
Filed May 28, 1964, Ser. No. 371,029
9 Claims. (Cl. 305—11)

This invention relates to sealed track of the type used on crawler tractors and the like.

Heretofore sealing arrangements for endless tracks have been proposed, however, they have not been entirely satisfactory in cost and performance. In my track sealing arrangement I provide a relative inexpensive seal made of a flexible rubberlike portion and a hard face sealing portion. The rubberlike portion is compressed into the counterbore of the side bars aligned with the ends of the bushing to establish a static seal therebetween and to provide sufficient frictional engagement to prevent turning of the seal in the counterbore. I have designed my seal so that the flexible portion may change its shape when installed without detrimental extrusion thereof. Although a dry pin and bushing track connection may be sealed against foreign material, I anticipate use of my sealing arrangement in a lubricated pin and bushing joint and for this I provide means on the flexible portion to wipe the pin of grease during assembly so as to prevent grease from getting on the surfaces of the flexible portion which engage the counterbore of the side bar.

The following are objects of my invention which in all embodiments includes a seal component having a flexible annular portion and a hard annular ring portion with a flat sealing face:

(a) Low in cost,
(b) Substantially extends track life by its efficient reliable performance as a seal,
(c) Does not extrude its flexible portion during installation thereby avoiding exceeding the elastic limit of the flexible portion and weakening of the bond between the ring portion and flexible portion,
(d) Has a continuous sealing action between the flat sealing face and the mating sealing surface, and
(e) Has a superior bond between its flexible and hard portions.

These and other objects and advantages will be apparent to those familiar with the art to which my invention relates, when the following description is read in conjunction with the drawings in which.

Figure 1:
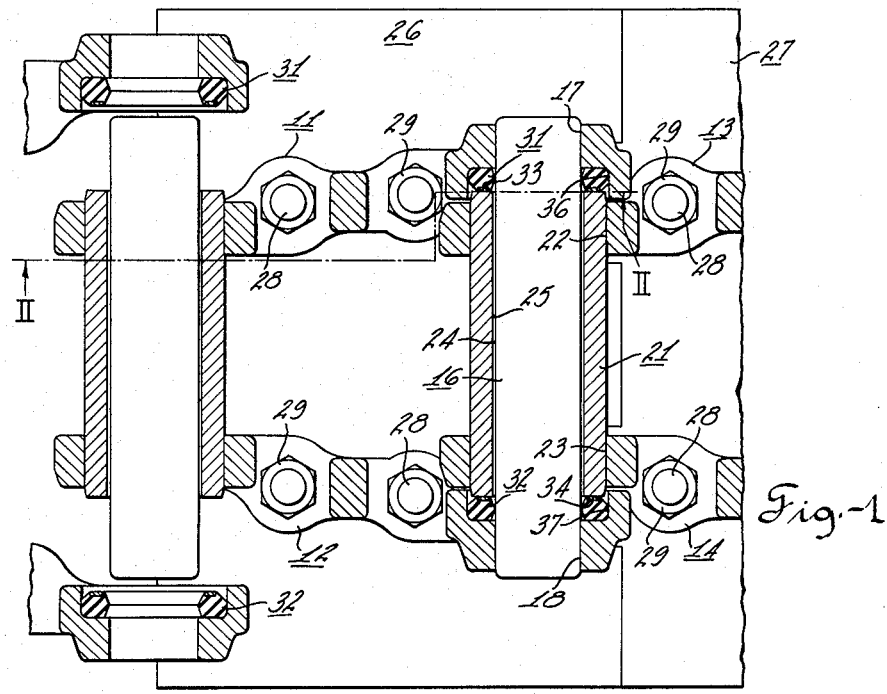
FIG. 1 is a longitudinal section through a portion of an endless track in which my invention is incorporated.
Figure 2:
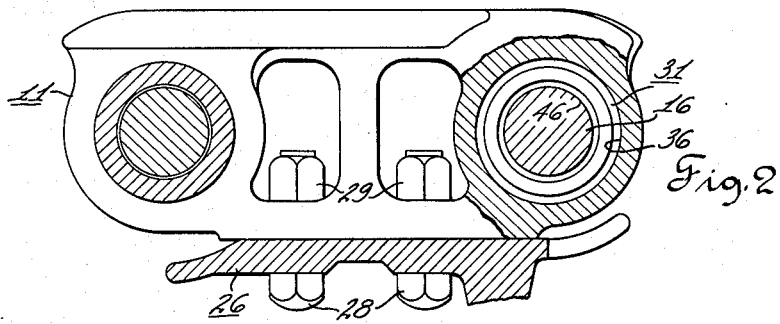
FIG. 2 is a section view taken along the line II—II in FIG. 1.
Figure 3:
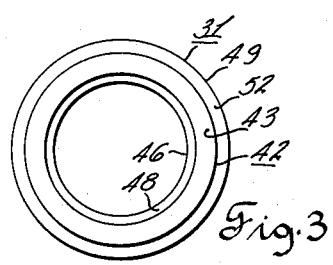
FIG. 3 is an end view of a seal component of my invention.

Referring to FIGS. 1, 2 and 3 the endless track in which I illustrate my invention includes a first pair of laterally spaced side bars 11, 12 interconnected with a second pair of side bars 13, 14 by a pivot joint including a pin 16 whose ends are press fit in pin bores 17, 18 and a bushing 21 whose ends are press fit in bushing bores 22, 23. The cylindrical surface 24 of pin 16 and the inner cylindrical surface 25 are in cooperative bearing engagement permitting relative pivotal movement between adjoining links. A shoe 26 is secured to side bars 11, 12, and a similar shoe 27 is secured to side bars 13, 14, by bolts 28 and nuts 29.

Heretofore considerable wear has been experienced in the bearing portions of the pin and bushing due to entrance of foreign material therebetween. A primary object of my invention is the provision of an effective sealing arrangement to exclude foreign material from the bearing area. This I accomplish by employing a pair of unique seal components or structures 31, 32 between the side bars 11, 12 and the axially opposite end surfaces 33, 34 of bushing 21. The seal structures 31, 32 are disposed within counterbores 36, 37 in side bars 11, 12, which open axially in confronting relation to one another. The counterbores form pockets on the inner sides of the side bars 11, 12 coaxial to and in axial continuation of the pin bores 17, 18.

Figure 4:
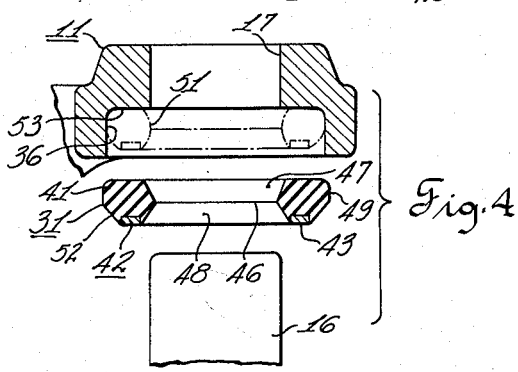
FIG. 4 is an exploded view of parts of an endless track depicting the assembled and nonassembled condition of the sealing component.

Referring to FIG. 4 the seal component includes a resiliently flexible portion 41 made of a rubberlike material such as neoprene or buna N synthetic rubber having 50 to 70 Durometer hardness and a metal sealing ring portion 42 bonded thereto on its exterior surfaces other than its flat sealing face 43 which upon installation is brought into fluid sealing engagement with end sealing surface 33. The sealing surface 33 and face 43 are finished by a suitable manufacturing process to a good sealing finish.

As shown in solid lines in FIG. 4 the flexible portion of seal component 31, in its noninstalled condition, has a larger outer diameter than the diameter of counterbore 36. Also the annular wiping edge 46 formed at the junction of inwardly converging tapered surfaces 47, 48 is of lesser diameter than pin 16. During assembly the seal component 31 is first compressed into counterbore 36 of side bar 11. The outer cylindrical surface 49 frictionally and sealingly engages the cylindrical surface of counterbore 36 so as to prevent the component 31 from rotating relative to side bar 11. When installed, as is shown in dot dash lines 51 in FIG. 4, the flexible portion 41 resiliently changes its shape to that illustrated without a permanent set, and without exceeding the elastic limit of the flexible material of which it is fabricated. In order to provide space for change of shape of the flexible portion 41 when installed I taper it from the outer cylindrical surface 49 to the seal ring 42 providing conical surface 52. After the seal component 31 is compressed into the side bar counterbore, the pin is pushed through the flexible portion as it is press fit in pin bore 17. The wiping edge wipes the grease from the pin 16 maintaining it substantially in the bearing area between the pin and bushing. This prevents grease from entering between the flexible portion 41 and the flat end surface 53 of the counterbore 36 which would cause detrimental slipping of the seal component in the counterbore.

When installed the flexible portion of the seal component is resiliently compressed to a reduced axial thickness thereby providing backup pressure to maintain the sealing face 43 and bushing sealing surface 33 in cooperative sealing engagement. I make the sealing face 43 radially narrow enough to insure its engaging a flat sealing surface such as surface 33 of bushing 21. Thus particles cannot wedge their way between the sealing surfaces. The outer diameter of the sealing face 43 is less than the outer diameter of end surface 33 and the inner diameter of sealing face 43 is greater than the inner diameter of sealing surface 33.

I have found that my seal arrangement has markedly increased the life of endless tracks at a very small increase in cost. My seal component is relatively easy to install and gives reliable sealing performance in endless track joints.

The embodiments of the invention for which an exclusive property or privilege is claimed are defined as follows:

1. An endless track link construction comprising:
a bushing having coaxial cylindrical inner and outer surfaces and axially outward facing flat sealing surfaces on its axially opposite termini,
a first pair of side bars having aligned bushing bores, respectively, in press fit relationship with opposite ends of said bushing, a cylindrical pin extending through said bushing with axially opposite ends extending axially beyond the ends of said bushing, a second pair of side bars having aligned pin bores, respectively, in press fit relationship with said opposite ends of said pin, annular pockets formed in the inner sides of said second pair of side bars coaxially to said pin bores, said annular pockets opening axially toward one another in facing relation to said sealing surfaces, and a pair of annular seal structures each having
a resiliently flexible nonmetallic backup portion compressed into one of said annular pockets, respectively, with an annular wiping portion at its inner diameter resiliently and sealingly engaging said pin and including annular surfaces converging radially and axially inwardly from its axially opposite sides to said wiping portion, and
a hard, relatively inflexible annular sealing ring having a flat sealing face in sealing engagement with one of said sealing surfaces and having substantially all the remainder of its exterior integrally secured to said nonmetallic portion.

2. The structure set forth in claim 1 wherein the inner diameter of said sealing face is greater than the inner diameter of said sealing surface and the outer diameter of said sealing face is less than the outer diameter of said sealing surface.

3. The structure set forth in claim 2 wherein said flexible portion has an annular surface tapering axially and radially from its outer periphery at its approximate central radial plane to said sealing ring.

4. An endless track link construction comprising:
a bushing having coaxial cylindrical inner and outer surfaces and an axially outward facing flat sealing surface on one of its axially opposite ends,
a first side bar having a bushing bore in press fit relationship with said one end of said bushing,
a cylindrical pin extending through said bushing with one end extending axially beyond said one end of said bushing,
a second side bar having a pin bore in press fit relationship with said one end of said pin,
a counterbore in said second side bar in confronting relation to said one end of said bushing, and
an annular seal structure having
a resiliently flexible nonmetallic backup portion in static sealing engagement with said counterbore with an annular wiping edge at its inner diameter resiliently and sealing engaging said pin, said wiping edge being disposed approximately intermediate the axially opposite sides of said annular seal structure, and
a hard, relatively inflexible annular sealing ring having a flat sealing face in sealing engagement with said sealing surface and having all its other exterior surfaces bonded to said flexible portion, said ring having an inner diameter substantially larger than the diameter of said pin and having an outer diameter substantially smaller than the outer diameter of said flexible portion.

5. The structure set forth in claim 4 wherein the radially outward facing surface of said flexible portion contacts said counterbore over an axial distance less than the axial width of said flexible portion and said flexible portion is in axial thrust transmitting engagement with the end of said counterbore.

6. The structure set forth in claim 5 wherein said flexible portion is made of a material having a hardness of 50 to 70 Durometers and having resistance to permanent set.

7. An annular sealing component for a face type seal comprising:
a hard, relatively inflexible annular seal ring portion having a flat annular sealing face, and
a resiliently flexible annular portion bonded to all the exterior surfaces of said ring portion other than said sealing face and having
a cylindrical radially outward facing surface extending axially substantially less than the axial width of said sealing component,
a surface tapering radially inwardly from said cylindrical surface to said seal ring portion, and
an annular wiping edge at its inner circumference spaced radially inwardly of the inner diameter of said seal ring portion and intermediate the axially opposite sides of said flexible portion.

8. The structure set forth in claim 7 wherein said wiping edge is formed by the junction of a pair of tapering annular surfaces converging radially inwardly from axially opposite sides of said flexible portion.

9. An endless track link construction comprising:
a bushing having coaxial cylindrical inner and outer surfaces and an axially outward facing flat sealing surface on one of its axially opposite ends,
a first side bar having a bushing bore in press fit relationship with said one end of said bushing,
a cylindrical pin extending through said bushing with one end extending axially beyond said one end of said bushing,
a second side bar having a pin bore in press fit relationship with said one end of said pin,
a counterbore in said second side bar in confronting relation to said one end of said bushing, and
an annular seal structure having
an annularly continuous and resiliently flexible nonmetallic backup portion in static sealing engagement with said counterbore and including annular surfaces converging radially and axially inwardly from its axially opposite sides to an annular wiping edge in nonrotatable sealing engagement with said pin, and
a hard relatively inflexible annular seal ring portion having a flat and annularly continuous sealing face at one of its axially opposite sides in relatively rotatable sealing engagement with said sealing surface on said bushing and having its other axial side bonded to said flexible portion, said seal ring portion having an interior diameter substantially greater than the diameter of said pin and an exterior diameter substantially smaller than the exterior diameter of said flexible portion.

References Cited by the Examiner

UNITED STATES PATENTS

| | | | |
|---|---|---|---|
| 2,368,611 | 1/1945 | Charnock | 308—36.1 |
| 2,376,864 | 5/1945 | Eberhard | 305—11 |
| 2,420,047 | 5/1947 | Marien. | |
| 2,509,436 | 5/1950 | Isenbarger | 277—188 |
| 2,614,006 | 10/1952 | Beckman | 308—36.1 X |
| 2,622,449 | 12/1952 | Barker. | |
| 2,699,974 | 1/1955 | Deffenbaugh | 305—58 X |
| 2,906,562 | 9/1959 | Burgman | 305—11 |

BENJAMIN HERSH, *Primary Examiner.*

R. J. JOHNSON, *Assistant Examiner.*